UNITED STATES PATENT OFFICE.

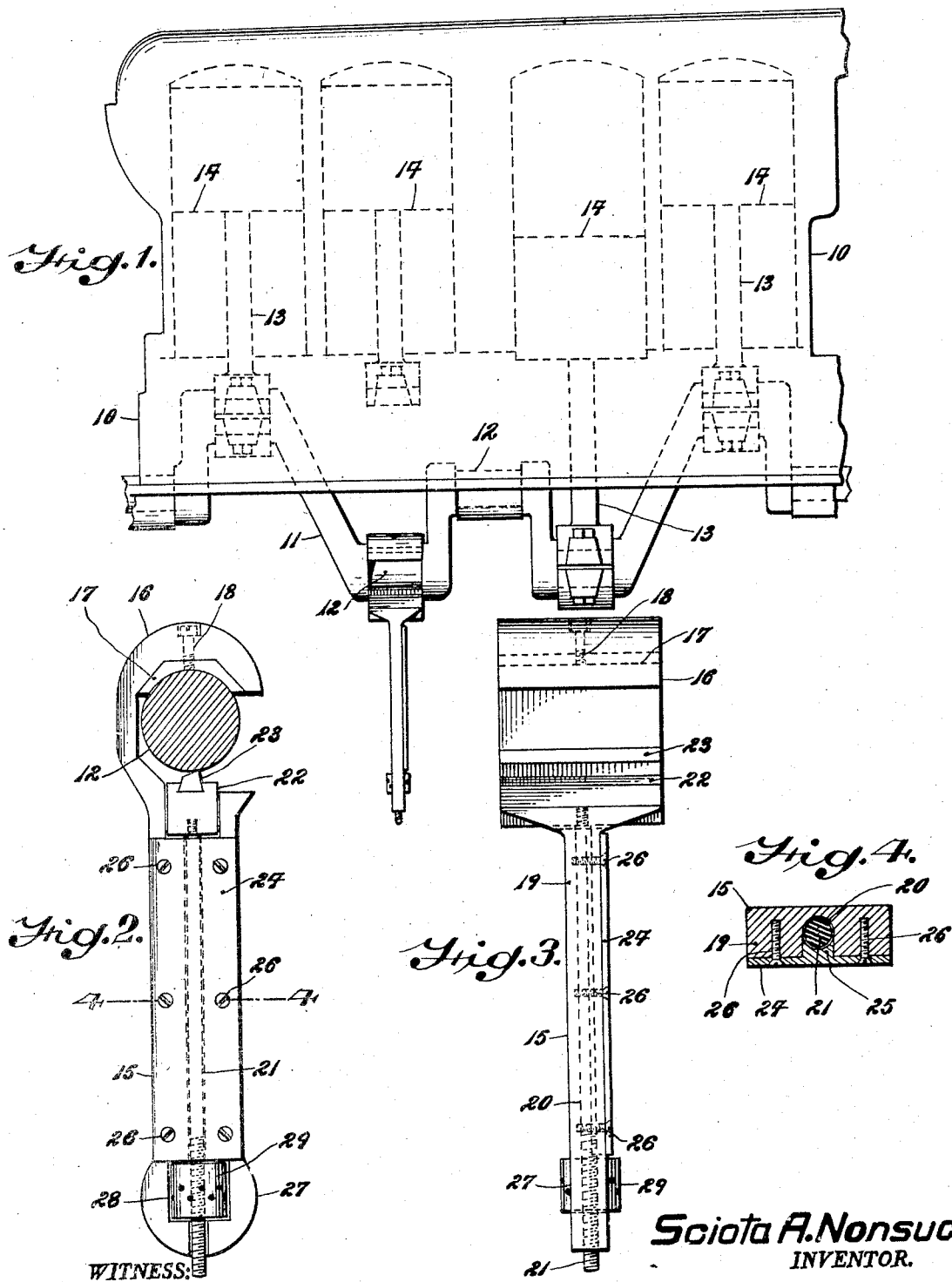

SCIOTA A. NONSUCH, OF PHILADELPHIA, PENNSYLVANIA.

CRANK-PIN-REFINISHING TOOL.

1,341,577.   Specification of Letters Patent.   Patented May 25, 1920.

Application filed September 22, 1919. Serial No. 325,367.

*To all whom it may concern:*

Be it known that I, SCIOTA A. NONSUCH, a citizen of the United States, residing at Philadelphia, in the county of Philadelphia and State of Pennsylvania, have invented new and useful Improvements in Crank-Pin-Refinishing Tools, of which the following is a specification.

The invention relates to tools and has for an object to provide a device for re-finishing and turning up cylindrical pieces of material or material having cylindrical surfaces.

The invention comprehends among other features a tool that is particularly adapted to the crank-pins of automobiles for the re-finishing thereof and to this end provides a simple device which can be applied to the crankpins of the crankshafts of automobiles without necessitating the taking down of the entire motor, the implement being particularly useful for the purpose described in that the re-finishing operation of the crankpin of the crankshaft of an automobile is accomplished by the use of the tool and the rotation of the crankshaft in the usual manner while it is on and forms a part of the automobile structure.

In the further disclosure of the invention, reference is to be had to the accompanying drawings constituting a part of this specification, in which similar characters of reference denote corresponding parts in all the views, and in which—

Figure 1 is a fragmentary elevation of an internal combustion motor showing the crank casing removed to disclose the crank shaft, the view showing one of my devices applied thereto with the cylinders and connecting rods and parts of the crankshaft shown in dotted lines.

Fig. 2 is an elevation of the implement applied to a crankpin, the latter being shown in cross section.

Fig. 3 is another elevation of the device looking at the side thereof, and

Fig. 4 is a horizontal sectional view taken on the line 4—4 in Fig. 2.

Referring more particularly to the views the numeral 10 indicates an internal combustion motor which includes the usual crankshaft 11 having crankpins 12 to which are connected the connecting rods 13 for the pistons 14. In the use of my device for re-finishing a worn crankpin 12, I disconnect the connecting rod 13 from the particular crankpin that is to be refinished and then I apply my implement and rotate the crankshaft in the usual manner.

The implement as shown particularly in Figs. 2, 3, 4, comprises a body 15 of an elongated nature and which at one end terminates in a head 16, the latter carrying therein a suitable bearing or seat 17 secured by a set screw 18, which bearing or seat accommodates the crankpin 12. The handle or shank end 19 of the body 15 is formed with a longitudinal groove 20 in which is disposed a screw rod 21, the upper end of which has a tool or block 22 swiveled thereon, the latter carrying a cutting tool 23 which is adapted to operate over the periphery of the crank pin. A plate 24 having a central longitudinally extending rib 25 is fitted on to the body 15 with the part 25 resting in the groove 20 with the plate being secured by suitable screws 26. The body at the lower end of the shank or stem 19 is formed with a smaller or supplementary head 27 having a cross opening 28 and loosely disposed therein is a cylindrical operating element 29 which is threaded on to the threaded portion of the rod 21 so that when the part 29 is rotated, the screw rod will be advanced to in turn advance the tool 23 into engagement with the periphery of the crankpin.

Now by reference to Fig. 1, it will be seen that when the device is applied to the crankpin as shown, it is merely necessary to hold the device vertically, by grasping the shank or stem and then as the crankshaft is rotated the tool 23 will have its cutting edge engaging the periphery of the crankpin to re-finish the latter, the feeding of the tool into engagement with the periphery of the crankpin being accomplished by rotating the element 29.

From the foregoing description it will be seen that the device described is of a simple construction; consists of few parts that cannot readily get out of order and that, in its application to the re-finishing of the crankpins of the crankshafts of internal combustion motors, it is not necessary to remove the entire crankshaft, but merely to remove the lower crank case and the connecting rod of the crankpin that is to be refinished so that the tool can be applied to the crankpin after which the connecting rod can be reëngaged with the crank pin and the tool applied to another crankpin of the same crankshaft, the connecting rod of the second crankpin being of course first disengaged therefrom, before the tool is applied.

Having described my invention, I claim—

1. A crankpin re-finishing tool comprising a body formed to provide a shank and a head with the shank having a longitudinal groove therein and the head formed with a recessed portion, a bearing plate disposed in the recessed portion of the head, an operating rod in the grooved portion of the shank, a tool holder movably mounted on the head and operable by the said operating rod and a tool carried by the holder to engage the crankpin accommodated to the bearing plate in the head.

2. A crankpin re-finishing tool comprising a body formed to provide a shank and a head with the shank having a longitudinal groove therein and the head formed with a recessed portion, a bearing plate disposed in the recessed portion of the head, an operating rod in the grooved portion of the shank, a tool holder movably mounted on the head and operable by the said operating rod, a tool carried by the holder to engage the crankpin accommodated to the bearing plate in the head and a revoluble element mounted in the lower end of the shank and in threaded engagement with the said rod for actuating the latter.

In testimony whereof I affix my signature.

SCIOTA A. NONSUCH.